United States Patent [19]
Buljan et al.

[11] Patent Number: 6,102,024
[45] Date of Patent: Aug. 15, 2000

[54] BRAZED SUPERABRASIVE WIRE SAW AND METHOD THEREFOR

[75] Inventors: Sergej-Tomislav Buljan, Acton; Richard M. Andrews, Westborough, both of Mass.

[73] Assignee: Norton Company, Worcester, Mass.

[21] Appl. No.: 09/038,300

[22] Filed: Mar. 11, 1998

[51] Int. Cl.[7] ........................................................ B28D 1/08
[52] U.S. Cl. ............................................................... 125/21
[58] Field of Search ................................. 125/16.02, 21; 83/651.1; 451/541

[56] References Cited

U.S. PATENT DOCUMENTS

| | | | |
|---|---|---|---|
| 2,793,478 | 5/1957 | Rohowetz | 51/188 |
| 3,150,470 | 9/1964 | Barron . | |
| 3,178,273 | 4/1965 | Libal . | |
| 3,854,898 | 12/1974 | Whitney, Jr. | 51/295 |
| 3,884,212 | 5/1975 | Armstrong et al. | 125/21 |
| 3,894,673 | 7/1975 | Lowder et al. . | |
| 4,018,576 | 4/1977 | Lowder et al. . | |
| 4,055,700 | 10/1977 | Ronnquist et al. . | |
| 4,187,828 | 2/1980 | Schmid . | |
| 4,384,564 | 5/1983 | Smith et al. . | |
| 4,627,950 | 12/1986 | Matsui et al. | 264/103 |
| 4,643,740 | 2/1987 | Nicolson . | |
| 4,646,710 | 3/1987 | Schmid et al. . | |
| 4,727,852 | 3/1988 | Schmid et al. . | |
| 4,776,862 | 10/1988 | Wiand . | |
| 4,866,888 | 9/1989 | Murai et al. | 51/401 |
| 4,968,326 | 11/1990 | Wiand . | |
| 5,062,865 | 11/1991 | Chen et al. . | |
| 5,127,924 | 7/1992 | Russell . | |
| 5,250,084 | 10/1993 | Lansell et al. . | |
| 5,377,568 | 1/1995 | Hauser . | |
| 5,377,659 | 1/1995 | Tank et al. . | |
| 5,383,443 | 1/1995 | Buyens . | |
| 5,438,973 | 8/1995 | Schmid et al. . | |
| 5,492,771 | 2/1996 | Lowder et al. . | |
| 5,511,718 | 4/1996 | Lowder et al. . | |
| 5,571,296 | 11/1996 | Barber, Jr. et al. | 51/295 |
| 5,616,065 | 4/1997 | Egglhuber . | |
| 5,846,269 | 12/1998 | Shiue et al. . | |

FOREIGN PATENT DOCUMENTS

| | | |
|---|---|---|
| 3-104553 | 5/1991 | Japan . |
| 9-254006 | 9/1997 | Japan . |
| 599 837 | 5/1978 | Switzerland . |
| 962357 | 7/1964 | United Kingdom . |
| 1342359 | 1/1974 | United Kingdom . |
| WO 98/05466 | 2/1998 | WIPO . |

*Primary Examiner*—Timothy V. Eley
*Assistant Examiner*—Dung Van Nguyen
*Attorney, Agent, or Firm*—Jeffrey C. Lew; Mary E. Porter

[57] ABSTRACT

A wire saw has a small diameter metal wire and a layer of abrasive grains firmly affixed to the wire surface by a brazed active metal bond. Preferably, the grains are present in a single layer. The grains are disposed on the surface of the wire in a preselected surface distribution. The wire saw can be made by a completely continuous process involving coating the wire with a paste of metal bond powder components combined with a fugitive liquid binder composition. Abrasive grains are deposited into a layer of the paste. Thereafter, the bond composition is fused at elevated temperature to braze the grains to the wire. The abrasive grains can include superabrasive materials, such as diamond and cubic boron nitride. Accordingly, the novel wire saw is suitable for cutting ultra thin wafers ceramic wafers with minimum waste of the work piece.

39 Claims, No Drawings

BRAZED SUPERABRASIVE WIRE SAW AND METHOD THEREFOR

FIELD OF THE INVENTION

This invention relates to a wire saw studded with superabrasive grit. More specifically, it relates to a wire saw having superabrasive particles bonded directly onto a fine metal wire substrate with an active metal braze.

BACKGROUND AND SUMMARY OF THE INVENTION

Wire saw technology is used in a variety of industrial applications. They have been used to cut rock in the mining industry. Conventional wire saws generally have abrasive beads strung along a wire, cable or rope threaded through a central bore of each bead. The abrasive grains are embedded into the outer surface of the beads and the beads are longitudinally displaced on the wire by spacers. See for example, U.S. Pat. No. 5,377,659 to Tank et al. Also, U.S. Pat. No. 5,383,443 to Buyens provides an improvement to a beaded wire saw in which the beads are mounted eccentrically on the wire.

China Grinding Wheel Co., Taipei, Republic of China, offers a beaded wire saw that uses diamond grains brazed to the bead. These beads are available under the tradename Kinik® DiaGrid® Pearls for use in cutting construction material such as marble, serpentine, granite and concrete.

The slicing of ceramic, especially blocks of single crystal silicon, occasionally referred to herein as a boule of silicon, to make thin wafers is very important for the microelectronics, optics and photovoltaic industries. The precision of cut is important to produce wafers that are flat to high dimensional tolerance. Traditionally, ceramic wafers have been made by sawing the boule with an unusual grinding wheel having abrasive bound to the inner diameter of a central bore. Such "inner diameter sawing" allows for extremely precise cutting but is limited to slicing only one wafer at a time.

Recent wire sawing has been applied to ceramic wafer production. Increased productivity can be obtained by using a long wire saw strung in such a way as to make many passes across the length of the boule thereby slicing many wafers simultaneously. The work piece is of very high quality and therefore, even slight waste of raw material can be very costly. Prior wire saw technology thus involves using a plain metal wire and loose abrasive grains applied at the interface between the wire and the boule.

Conventional beaded wire saws generally are not suitable for precision grinding demanded by wafer slicing. The beads increase the effective thickness of the tool which cuts too wide a kerf through the work piece. The mass of work piece removed by the beaded saw can be many times that of a single wafer. The use of spacers and sleeves further complicates fabrication of beaded saws.

Another technique that might reduce the kerf of a wire saw for wafer slicing involves electrochemical deposition of abrasive directly onto the wire substrate. Electrochemical deposition generally calls for placing an electrically charged wire in a bed of abrasive particles in an oppositely charged liquid solution of a metal compound. As metal precipitates on the wire, it captures abrasive particles within a thin metal layer and thereby binds the abrasive to the wire. For example, U.S. Pat. No. 5,438,973 to Schmid et al., discloses blades having diamond abrasive particles fixed in nickel plating to a cutting surface of a tear-drop cross section stainless steel wire core.

Wire saws made by electrochemical deposition have the principal shortcoming that there is no chemical bond between the abrasive and the deposited coating. During operation, the outer surface of the thin layer is soon worn away, and the abrasive particles easily dislodge from the wire when less than about half of the deposited metal is eroded. Hence, the saw becomes ineffective prematurely, i.e., before the abrasive particles become dull. Plated metal can also debond from the wire under cyclic load.

Another shortcoming of electrochemically deposited wire saws is that they are expensive to manufacture. The mass of abrasive in the bed should be far in excess of that which actually ends up on the wire. Of course, superabrasive particles are quite expensive, and the need to maintain an inventory of particles in the bed raises the cost. Furthermore, control of the abrasive particle distribution on the wire is not practicable.

It is desirable to have a superabrasive wire saw that has a small cross section dimension, especially for cutting thin sections such as ceramic wafers. A superabrasive wire saw that has long service life and which is simple and relatively inexpensive to make is also needed. It is further desired to have a process for making such a wire saw that provides precise and sensitive control of abrasive distribution on the wire.

Accordingly, the present invention provides a wire saw comprising a metal wire, and superabrasive grains affixed to the wire by a brazed metal bond, wherein the grains are preferably disposed upon the surface of the wire with a preselected surface distribution.

There is further provided a process for making a wire saw comprising the steps of:

(a) providing a paste comprising a metal brazing composition;

(b) coating the surface of a wire with a layer of the paste;

(c) depositing on the layer of paste a layer of abrasive grains;

(d) heating the wire in an inert atmosphere to a temperature and for a duration effective to fuse the brazing composition; and (e) cooling the wire thereby brazing the grains to the wire.

DETAILED DESCRIPTION

In one aspect, the wire saw according to the present invention includes a core of metal wire and a single layer of abrasive grains affixed directly thereto by a brazed metal bond, which preferably is an active metal bond. The saw can be used in conventional cutting operations. Accordingly the wire should be able to withstand the tension, heat and bending to which such saws are usually subjected. Hence, the wire material should have sufficient strength, flexibility and high fusion temperature that it can serve satisfactorily in cutting. The wire metal also should fuse at temperature sufficiently far above the metal bond liquidus temperature that the wire is not weakened or otherwise adversely affected by brazing the grains thereto. Representative wire metals include iron, molybdenum, tungsten and alloys containing any of them. Steel is sometimes acceptable, however, it may lose tensile strength due to exposure to high temperature during brazing. High carbon steel is usually less affected. Strength of steel wire can be recovered to a large degree by including a quenching (i.e., rapid cooling) step to the process. Tungsten is preferred because it is substantially unaffected by thermal treatment involved in the manufacture of the wire saw, however, any metal wire having the specified shape and physical properties would be suitable for use in this invention.

Preferably, the wire has a cylindrical geometry characterized by a longitudinal axis and a circular cross section perpendicular thereto. Suitable wire saws adapted for specialized utilities can be obtained by use of non-circular cross section wires. For example, the cross section can be oval, flat, non-flat, rectangular, such as square, trapezoidal and low order polygonal, i.e., 3–6-sided polygons. By "flat" is means that the wire is of high aspect ratio, rectangular cross section, like a ribbon, i.e., having a characteristic long dimension and a characteristic wide dimension with the wide dimension being less than about 10% of the long dimension. One can appreciate that ribbons made according to this invention can be useful as band saw blades, including those having abrasive grit placed on the whole surface or only part of the surface of the blade.

In accordance with a main objective of the wire saw to cut thin ceramic wafers, i.e., "precision cutting", the diameter of the wire should be as small as practicable to minimize kerf loss. Tension on the wire during sawing effectively limits the diameter. The wire diameter at its largest dimension usually will be in the range of about 140–1000 $\mu$m, and preferably, about 150–250 $\mu$m.

In another aspect of this invention the wire saw can also be useful for cutting construction material or rock, such as in mining applications, i.e., in "coarse cutting" utilities. To obtain an effectively strong wire with adequate tool life to such utilities, the diameter of the wire should be increased significantly to the range of about 1–5 mm. In coarse cutting applications a single strand metal wire can be used or multiple strands of metal wire can be braided together to obtain capable or rope of the desired overall diameter. Abrasive can be brazed to the single or multi-strand substrate.

Consistent with the stated primary purpose of the novel wire saw to slice ceramic wafers, and especially, silicon wafers, preferably the abrasive grit comprises a superabrasive. Diamond, cubic boron nitride and mixtures of them in any proportion are suitable. Diamond can be natural or synthetic. The abrasive component of the saw can also include non-superabrasive particles in combination with superabrasives, with the proviso that the non-superabrasive can withstand the metal brazing process for attachment to the wire. Preferably, the major fraction, i.e., greater than 50 vol % of the abrasive component will be superabrasive. Representative non-superabrasives which are useful include silicon carbide, aluminum oxide, tungsten carbide and the like having a Knoop hardness value of about 1000–3000 as measured under an applied load of 500 g. Particular preference is given to a wire saw in which the abrasive component is exclusively superabrasive.

In a preferred embodiment, the abrasive particles are placed on the wire in substantially a single particle thickness layer. The term "single particle thickness layer" means that a single layer of abrasive particles is present on the substrate. The grains also should be selected to provide a narrow particle size distribution. This provides a more uniform cutting edge of the saw. The saw can be "trued" to a more precisely uniform cutting edge, however, generally the more similar in size the particles, the less truing needed. The particle size distribution can be controlled by selective multiple screening of grit stock. For precision cutting preference is given to particles of about 5 . 50 $\mu$m and to uniform particle size distribution in which at least about 90% of the grains are about 0.85–1.15 of the average grain size. Accordingly, the overall cross section dimension of the abrasive-bearing novel wire saw for precision grinding of ceramic wafers preferably should be about 180–300 $\mu$m. For coarse grinding, large particle size abrasive grit, i.e., about 600 $\mu$m is preferred and thus the overall cross section dimension of the saw will be about 2.2–6.2 mm.

As mentioned, the grains are affixed directly to the metal wire preferably by a brazed metal bond, and more preferably a brazed active metal bond. Compositions for brazed metal bonds to affix abrasive grains to a metal tool preform are well known. Illustrative brazed metal bond compositions include gold, silver, nickel, zinc, lead, copper, tin, alloys of these metals and alloys of these metals with other metals, such as phosphorous, cadmium, vanadium and the like. Generally minor amounts of additional components can be included in the braze composition to modify the properties of the bond during and after brazing, such as to modify melting temperature, melt viscosity, abrasive surface wetting and bond strength. Copper/tin bronze-based alloys or nickel based alloys are preferred for bonding abrasives, especially superabrasives to metal.

By "active metal bond" is meant a bond created from a metal composition as described above into which certain so-called "active metals" or "reactive metals" are additionally incorporated. These active metals are characterized by an ability to react with carbon or nitrogen to form carbides or nitrides while the metal bond composition is fused at elevated temperature of the brazing process. The carbides or nitrides thus formed are chemically compatible with superabrasives so as to improve the wetting of the superabrasive particles by the molten liquid bond composition and to promote strength of attachment between particle and bond. Representative active metals of particularly high value for bonding diamond include titanium, tantalum, chromium, and zirconium. Generally, the active metals should be present as a minor fraction of the metal bond composition, and can be as low as about 0.5 wt % thereof.

A particularly preferred active metal bond composition comprises a bronze alloy and titanium. The bronze alloy is preferably about 10–30 wt % tin, and more preferably about 23–25 wt % tin, the complementary amount to total 100 wt % being copper. Titanium is present at about 2–25 wt %, and preferably about 5–10 wt %. Particular preference is given to active metal bond compositions comprising about 19–21 wt % tin, about 69–73 wt % copper and about 8–10 wt % titanium.

The titanium should be in the bond composition in a form which can react during brazing. It can be added either in elemental or compound form. Elemental titanium reacts with water at low temperature to form titanium dioxide and thus could become unavailable to react with diamond during brazing. Therefore, adding elemental titanium is less preferred when water is present. Water sometimes can be a constituent of the liquid binder, described below. If titanium is added in compound form, the compound should be capable of dissociation during the brazing step to permit the titanium to react with the superabrasive. Preferably titanium is added to the bond material as titanium hydride, TiH$_2$, which is stable up to about 500° C. Above about 500° C., titanium hydride dissociates to titanium and hydrogen.

In still another much preferred embodiment, the active metal bond composition can contain bronze, titanium, and minor fractions of other active ingredients, such as zirconium and elemental carbon. The zirconium is added primarily to increase the viscosity of the bond material in the molten state during brazing. Preferably, the zirconium is added in elemental form. Zirconium in compound form, such as zirconium hydride, is usually unsuitable because the compound does not dissociates to elemental zirconium at or below brazing temperatures. The carbon reacts with excess free titanium present in the bond material during brazing to form titanium carbide particles. The benefit of titanium carbide is discussed below. Carbon can also react with zirconium to form hard zirconium carbide. Such composition comprises 100 parts by weight (pbs) bronze alloy consisting essentially of about 10–30 wt % tin and the balance copper, about 10–20 pbw titanium, about 5–10 pbw zirconium and about 0.1–0.5 pbw elemental carbon.

In yet another very preferred embodiment, fine particles of a hard material, especially of titanium carbide, can be added to the bond composition, as disclosed in U.S. patent application Ser. No. 08/693,763 filed Jun. 7, 1996, and which is hereby incorporated herein by reference. Titanium carbide can also be produced in situ as previously mentioned. It has been discovered that the titanium carbide particles can boost the impact strength of the brazed metal bond and thereby provides a bond of improved wear resistance. Preferably the hard particles should be of particle size between about 1 $\mu$m and about 10 $\mu$m.

The technique of coating the abrasive grains prior to brazing with an active metal can be applied to the present invention. In the case of nickel-based alloy brazes, a layer of preferably carbide forming, active metal, such as titanium, tungsten and zirconium, can be used. The metal can be placed on the abrasive by well known methods, for example, physical vapor deposition and chemical vapor deposition. As disclosed in U.S. patent application Ser. No. 08/813,145 filed Mar. 3, 1997, which is incorporated herein by reference, certain advantages have recently been identified to result from pre-coating superabrasive grains with a mechanically bound layer of a first active component in concert with use of a copper/tin alloy braze composition containing a second active component. More specifically, the total amount of active component present in the resulting brazed composition is much less than necessary for bonds made by only incorporating an active component in the braze composition. This creates a strong bond to the superabrasive yet minimizes the amount of active component available to form intermetallic compositions.

Generally, the components of the bond material are supplied in powder form. Particle size of the powder is not critical, however, powder smaller than about 325 mesh (44 $\mu$m particle size) is preferred. The bond material is prepared by mixing the ingredients until the components are dispersed to a uniform concentration.

The dry powder bond material can be mixed with a low viscosity, fugitive liquid binder. The binder is added to the powder components in effective proportion to form a viscous, tacky paste. In paste form, the bond material can be accurately dispensed and is adhesive to both the surface of the wire and the abrasive grains. Paste viscosity can vary within a wide range depending upon the process used to apply the paste to the wire. Preferably, the bond material paste should have the consistency of tooth paste.

The term "fugitive" means that the binder should be sufficiently volatile to substantially completely evaporate and/or pyrolyze during brazing without leaving a residue that might interfere with the function of the bond. Preferably the binder will vaporize below about 400° C. However, the binder volatility should be low enough that the paste remains fluid and tacky at room temperature for a reasonable time ("drying time") to apply the bond material and abrasive to the wire. Preferably the drying time should be about 1–2 hours at room temperature. Liquid binders suitable to meet the requirements of the novel bond material are commercially available. Representative paste-forming binders suitable for use in the present invention include Braz™-Binder Gel from Vitta Corporation, "S" binder from Wall Colmonoy Corporation, Madison Heights, Mich.; and Cusil-ABA, Cusin-ABA, and Incusil-ABA pastes from Wesgo, Belmont, Calif. Active metal braze composition pastes including binder premixed with metal braze composition components can be obtained from Lucas-Millane Company, Cudahy, Wis. under the Lucanex™ tradename, such as Lucanex 721.

The binder can be blended with the powders by many methods well known in the art such as high shear mixing. The order of mixing powders and liquid binder is not critical. The paste is coated onto the wire by any of the techniques well known in the art, such as brushing, spraying, doctoring or dipping the wire tool in the paste.

The novel wire saw can be produced quite effectively by a continuous process. The wire can conveniently by supplied on a spool. The spool is unwound by drawing the wire through a zone where the abrasive and bond precursor are deposited. Optionally, the wire can be pretreated, such as mechanically or chemically cleaning the surface to remove oxides or to roughen the surface for better adhesion of the grains and bond materials to be added.

In one embodiment, the bond precursor and abrasive grains are applied sequentially. That is, while continuously drawing the wire through the deposition zone, first a brazing paste composition is coated onto the wire surface. The layer of paste forms a bed to receive the grains. Thereafter, the abrasive grains are deposited in the bed of paste.

The thickness of brazing paste layer generally should be about 100–200% of the average grain size. This thickness is governed by such factors as the abrasive concentration and the fraction of binder used to make a paste of desired properties. The abrasive grains can be deposited by any method, for example, by individual placement, dusting or sprinkling. Such techniques enable the abrasive grains to be placed on the substrate at a preselected surface distribution. The surface distribution of the grains can be continuous or intermittent. Intermittent surface distribution is characterized by abrasive-free regions along the wire between abrasive occupied regions. An intermittent surface distribution tends to reduce the forces exerted on the wire and promotes efficient swarf removal. The continuous surface distribution can be uniform, or optionally, non-uniform along the length of the wire saw. A non-uniform continuous distribution of grains can approximate the performance of an intermittent surface distribution. Optionally, any filler components well known for use in abrasive tools also can be applied to dilute the other components. Generally, such filler components are inert to the brazing process. That is, they do not appreciable react with the brazing composition components, the abrasive grains or the metal wire.

A particular method of fabrication involves drawing the wire horizontally through the deposition zone while grains are sprinkled vertically downward onto the coated wire. This method features the ability to control the surface distribution of the grains on the wire. That is, the surface distribution, indicated by the number, volume or weight of abrasive grains per unit of wire surface can be adjusted easily by changing the rate of sprinkling the loose grains onto the moving, coated wire to achieve any desired surface distribution. Additionally, the amplitude of sprinkling can be pulsed or otherwise periodically varied to achieve a periodic longitudinal variation in surface deposition. Alternatively, the wire can be passed through a fluidized bed of grains in a carrier gas.

The sequential nature of the coating-deposition steps further features the ability to deposit abrasive grains in substantially a single particle thickness layer. Because the grains are temporarily held in place prior to brazing by the tackiness of the paste which is in a layer in contact with the wire, it is not possible for multiple layers of grains to build up. As an optional step, the wire can be shaken gently to dislodge excess or loosely held grains. Further, the wire can be drawn again through the deposition zone to increase the overall surface distribution or to boost the distribution in sparsely populated areas.

Grains deposited vertically onto a horizontal wire are not expected to contact the under side of the wire. To coat the wire surface uniformly, it is recommended to rotate the wire about its longitudinal axis through a preselected angle of rotation. Subsequently, the rotating wire can be drawn through the deposition zone again to allow grains to fall onto the freshly up turned portion of the wire surface.

Another technique is contemplated for depositing grains over the surface of the wire in a single pass. This involved coating the circumference of the wire with brazing paste. Then the coated wire can be drawn upward through an orifice at the base of a conical bin containing loose abrasive grains. The orifice shape and dimensions are selected to be slightly larger those of the wire. Preferably, the gap between the orifice and wire is less than the average grain size to prevent grains from falling through the orifice. As the wire is drawn through the orifice, grains adhere to the tacky surface and are pulled away with the wire. Fresh grains are motivated by the conical shape of the bin to impinge upon the wire emerging from below. The conical bin can be vibrated or otherwise agitated to promote even distribution of the grains around the orifice.

In another embodiment, the paste and grains are applied concurrently. That is, the grains are premixed with the brazing paste. The grain bearing paste is then applied to the bare wire. Preferably, the grains should be dispersed in the paste to a uniform concentration. The paste can then be applied to the wire by conventional wire coating methods. It is preferred that excess thickness of grain bearing paste is removed to assure that only a single particle thickness layer of abrasive remains on the wire.

It can be well appreciated that a multiple particle thickness abrasive layer can provide extended abrasive durability which is sometimes quite important. Extended durability is especially desirable in coarse cutting utilities where wider kerf on the multiple particle thickness wire saw construction can be tolerated. Accordingly, the premixed grain/brazing paste embodiment of this invention also can be used to provide a multiple particle thickness abrasive layer. This is accomplished by placing an appropriately thick layer of premixed grain/brazing paste in a single pass or by building up a thick layer by repeatedly depositing and brazing thin layers in multiple passes. The single pass method is preferred because it reduces the exposure of the wire to high temperatures that can weaken the wire.

The aforementioned methods of applying the brazing paste and abrasive particles are not intended to be limiting. Other variations for preparing the composite of wire, brazed metal bond composition and abrasive for brazing that are apparent to one of ordinary skill in the art are contemplated to fall within the purview of this invention.

After the brazed metal bond composition and abrasive grains are in place on the wire, the bond composition is subjected to thermal treatment to ultimately braze the grains firmly to the wire. The wire/bond composition/abrasive composite should be maintained at an intermediate temperature, usually much below brazing temperature for a duration sufficient to volatilize the fugitive component of the liquid binder. Thereafter, the temperature can be raised to fuse the bond components. This process can be carried out continuously by passing the moving wire through process zones maintained at appropriately preselected conditions. At conclusion of the process, the wire can be wound onto a spool for storage.

Brazing is performed at elevated temperatures selected in consideration of numerous system parameters such as solidus-liquidus temperature range of the braze metal bond composition, geometry and material of construction of the wire and the physical properties of the abrasive. For example, diamond can graphitize at temperatures above about 1000° C. in air and above about 1200° C. under vacuum or inert atmosphere. Of course, the temperature at which diamond graphitizes depends on the duration of exposure.

Also as mentioned, exposure to elevated temperatures can adversely affect the strength of the wire. Hence, it is often desirable to braze at the lowest possible temperatures. The metal brazing composition should be selected to braze preferably at about 800–1150° C., and more preferably, at about 850–950° C.

The thermal treatment should be performed under an inert atmosphere to protect against undesirable oxidation of the braze components. The inert atmosphere can be effected either with an inert gas, such as nitrogen or argon or a full vacuum, that is, below about 0.01 mm Hg absolute.

The heating can take place in an oven. Other suitable methods of heating include electrical resistance heating, and localized area heating methods, such as induction heating, laser heating, infrared heating and electron beam heating, and combinations of any of these. Localized heating methods reduce potential for weakening the wire due to over exposure to high temperatures. Localized are heating methods also present the opportunity to create intermittent abrasive coating including precise patterns of brazed metal bond and grains on the wire. In such case, unbrazed material can be removed, for example by brushing, shaking or air-jetting the wire. The removed materials can be recovered for possible recycling.

In a particularly preferred process for making the novel wire saw, a circular cross section, metal wire is drawn from a supply spool and directed downward along the central axis of a vertical, cylindrical paste chamber. The wire enters through a sealed orifice in the lid of the chamber. The chamber is packed with a uniform mixture of superabrasive grains and a braze paste of a braze metal bond composition and a fugitive liquid binder. The wire is withdrawn from the bottom of the chamber through a circular orifice having an inner diameter larger than the wire diameter. Optionally, pressure is exerted on the mixture, for example by pumping fresh abrasive/brazing pate mixture into the chamber or by compressing the mixture with a piston. The wire leaving the orifice is thus coated with abrasive grains embedded in the brazing paste. The diameter of the orifice is selected to assure that the layer of grains on the wire is either of a single particle thickness or a multiple particle thickness.

The coated wire next descends into a multiple temperature zone, vertical oven. The uppermost region of the oven to which the wire first becomes exposed is controlled at intermediate elevated temperatures in the range of about 250–500° C. As the temperature of the wire increases in this region, the fugitive liquid component of the binder volatilizes. If any reactive metal component, such as titanium hydride, is present, it also reacts to deposit active metal in the braze composition. Lower regions of the oven are controlled independently at higher temperatures up to the brazing temperature in one or more zones. The height of the oven zones, the zone temperature and the linear velocity of the wire passing through the oven determine the duration of exposure to the various temperatures. The oven can be sealed for isolation from ambient atmosphere. An inlet at the base and an outlet at the top of the oven are provided to sweep the interior with an inert gas.

The hot, brazed wire leaves the oven through a central orifice in the base. It is pulled by a turning pulley which redirects the wire to a horizontally oscillating wind up spool. The turning pulley can be situated in a bath of low temperature, liquid coolant to quench the wire prior to wind up. The pulley also places the wire under tension so that it passes through the center of the orifice and the oven.

As mentioned, the wire saw of this invention is well suited to cutting thin ceramic wafers from a work piece. The shape of the ceramic work piece is not critical. Typically it is a cylindrical boule of up to about 8 inches (20 cm) diameter. The wire saw can include a single wire blade configured similarly to a band saw to cut a single wafer from a work piece in each pass or to cut multiple wafers in one pass, for example as disclosed in U.S. Pat. No. 5,616,065 to Egglhuber, which is incorporated herein by reference. A series of single blades also can be configured in tandem to simultaneously cut multiple wafers from a work piece as shown in FIG. 4 of aforementioned U.S. Pat. No. 5,483,973. Due to the attachment of a single layer of small, uniformly sized abrasive particles directly on a small cross section dimension wire, the novel saw can cut thin wafers (i.e., as thin as about 300 $\mu$m) with very little waste of work piece material.

This invention is now illustrated by examples of certain representative embodiments thereof, wherein all parts, proportions and percentages are by weight unless otherwise indicated. All units of weight and measure not originally obtained in SI units have been converted to SI units.

EXAMPLE

A dry mixture was prepared by blending 14.823 g prealloyed 23% Sn/73% Cu powder (<44 $\mu$m), 1.467 g titanium hydride powder (<44 $\mu$m), and 3.480 g 10/20 $\mu$m diamond grains. This mixture resulted in a 33 volume percent diamond composition. A fugitive liquid binder was separately prepared by combining 20 weight parts Vitta Braze-Gel (Vitta Corporation) with 50 weight parts distilled water. The liquid binder was added to the dry mixture and manually stirred with a spatula in a glass beaker until a uniform paste was formed.

About 2 m of high carbon steel, lead bath quenched patented wire of 0.008 inch (0.2 mm) diameter was pulled through the paste at about 0.25 m/s to coat the paste onto the wire. The coated wire was air dried then brazed under vacuum (<1 $\mu$m Hg) in an oven at 880° C. for 30 minutes. A brazed metal bonded diamond abrasive wire was thus produced.

Although specific forms of the invention have been selected for illustration in the example and the preceding description is drawn in specific terms for the purpose of describing these forms of the invention, this description is not intended to limit the scope of the invention which is defined in the claims.

What is claimed is:

1. A wire saw comprising a metal wire having a maximum cross section dimension in the range of about 150–250 $\mu$m, and an abrasive layer having abrasive grains affixed directly to the wire by a brazed metal bond, wherein the grains comprise superabrasive grains of diamond or cubic boron nitride and the abrasive layer is present as a single particle thickness layer.

2. The wire saw of claim 1 wherein the abrasive grains are present on the wire in a preselected surface distribution.

3. The wire saw of claim 2 wherein the surface distribution is continuous.

4. The wire saw of claim 3 wherein the continuous surface distribution is uniform.

5. The wire saw of claim 2 wherein the surface distribution is intermittent.

6. The wire saw of claim 1 wherein the grains consist of diamond grains.

7. The wire saw of claim 6 wherein the metal bond comprises a brazed metal selected from the group consisting of gold, silver, nickel, zinc, lead, copper, tin, alloys of these metals, and alloys of these metals with phosphorous, cadmium or vanadium.

8. The wire saw of claim 7 wherein the metal bond comprises a bronze alloy consisting essentially of 10–30 wt % tin and a complementary amount of copper.

9. The wire saw of claim 8 wherein the metal bond further comprises a minor fraction of an active metal selected from the group consisting of titanium, tantalum, chromium, and zirconium.

10. The wire saw of claim 1 wherein the wire is a metal selected from the group consisting of iron, tungsten, molybdenum and alloys containing any of them.

11. The wire saw of claim 10 wherein the wire metal is tungsten.

12. The wire saw of claim 10 wherein the wire metal is steel.

13. The wire saw of claim 10 wherein the wire has a circular cross section.

14. The wire saw of claim 10 wherein the wire has a non-circular cross section.

15. The wire saw of claim 14 wherein the wire cross section is oval, rectangular, square, trapezoid or a polygon having 3–6 sides.

16. The wire saw of claim 14 wherein the wire cross section is flat.

17. The wire saw of claim 1 wherein the abrasive layer further comprises a filler component.

18. The wire saw of claim 1 comprising a plurality of metal wires to which abrasive grains are directly affixed by a brazed metal bond.

19. The wire saw of claim 1 in which the abrasive grains have a particle size in the range of about 5–50 $\mu$m and a uniform particles size distribution characterized by an average particle size and at least about 90% of the abrasive grains being from about 0.85 to about 1.5 of the average particle size.

20. A process for making a wire saw comprising the steps of:

(a) providing a paste comprising a metal brazing composition and a metal wire of maximum cross section dimension in the range of about 150–250 $\mu$m;

(b) coating the wire with a layer of the paste;

(c) depositing on the layer of paste a substantially single particle thickness layer of abrasive grains comprising diamond or cubic boron nitride;

(d) heating the wire in an inert atmosphere to a temperature of at most about 950° C. and for a duration effective to fuse the brazing composition; and (e) cooling the wire thereby brazing the grains to the wire.

21. The process of claim 20 wherein steps (b)–(e) are carried out continuously by drawing the wire through coating, depositing, heating and cooling zones.

22. The process of claim 21 wherein drawing includes disposing the wire horizontally in the deposition zone and depositing includes sprinkling the grains downward onto the horizontally disposed wire.

23. The process of claim 22 in which the wire defines a longitudinal axis and further including the steps of (c1) rotating the wire about the longitudinal axis of the wire after initially depositing grains and before heating; and (c2) repeating steps (c) and (c1) until a preselected portion of the wire is deposited with grains.

24. The process of claim 20 wherein the depositing step includes passing the wire through a fluidized bed of abrasive grains in a carrier gas.

25. The process of claim 20 wherein the abrasive grains are mixed with the paste to a uniform concentration prior to coating the wire with paste, and further wherein the grain containing paste is applied to the wire thereby accomplishing the coating and depositing steps concurrently.

26. The process of claim 25 wherein the grains are deposited in a single particle thickness layer.

27. The process of claim 25 wherein the grains are deposited in a multiple particle thickness layer.

28. The process of claim 25 further comprising the step of adding to the metal brazing composition a filler component.

29. The process of claim 25 wherein the abrasive grains are deposited on the wire in a preselected surface distribution.

30. The process of claim 29 wherein the preselected surface distribution is continuous.

31. The process of claim 30 wherein the continuous surface distribution is uniform.

32. The process of claim 29 wherein the preselected surface distribution is intermittent.

33. The process of claim 20 wherein the heating step includes localized area heating methods selected from the group consisting of induction heating, laser heating, infrared heating and electron beam heating.

34. The process of claim 30 wherein the grains consist of diamond.

35. The process of claim 34 wherein the wire is a metal selected from the group consisting of tungsten, molybdenum and alloys containing any of them.

36. The process of claim 35 wherein the metal bond comprises a brazed metal selected from the group consisting of gold, silver, nickel, zinc, lead, copper, tin, alloys of these metals, and alloys of these metals with phosphorous, cadmium or vanadium.

37. The process of claim 36 wherein the metal bond comprises a bronze alloy consisting essentially of 10–30 wt % tin and a complementary amount of copper, and further comprises a minor fraction of an active metal selected from the group consisting of titanium, tantalum, chromium, and zirconium.

38. The process of claim 36 wherein the metal bond comprises about 69–73 wt % copper, about 19–21 tin, and about 8–10 wt % titanium.

39. The process of claim 37 wherein the superabrasive grains are coated with a layer of carbide forming active metal prior to brazing.

* * * * *